Figure 1:
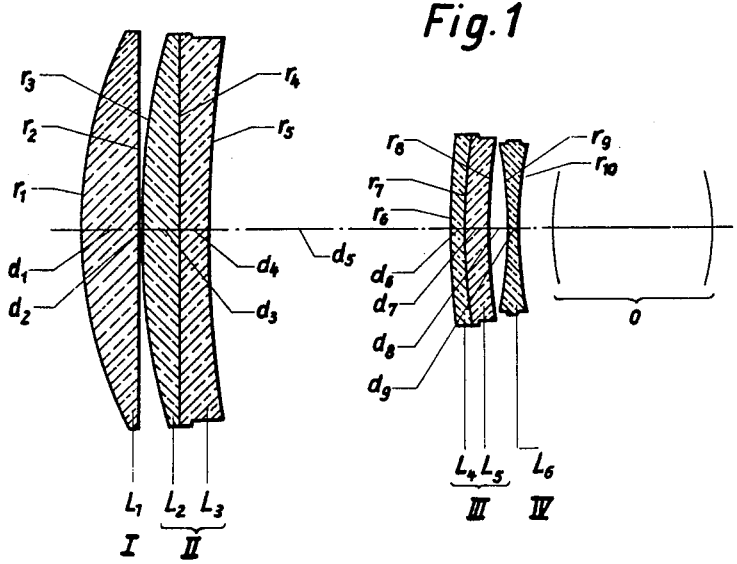

Nov. 16, 1965  R. SOLISCH ETAL  3,217,597
FOUR COMPONENT ANAMORPHOTIC ATTACHMENT LENS
Filed April 18, 1962

*Inventors*
Rudolf SOLISCH
Walter WÖLTCHE
by Karl F. Ross
AGENT

United States Patent Office 3,217,597
Patented Nov. 16, 1965

3,217,597
FOUR COMPONENT ANAMORPHOTIC ATTACHMENT LENS
Rudolf Solisch, Gottingen, and Walter Wöltche, Bad Kreuznach, Germany, assignors to Isco Optische Werke G.m.b.H., Gottingen-Weende, Germany, a company of Germany
Filed Apr. 18, 1962, Ser. No. 188,330
Claims priority, application Germany, Apr. 21, 1961,
J 19,799
4 Claims. (Cl. 88—57)

Our present invention relates to an anamorphotic attachment for a spherically effective optical objective, adapted to be used on a photographic or cinematographic camera or on a projector for the taking or the reproduction of wide-screen pictures.

Attachments of this type, e.g. as known from commonly assigned U.S. Patent No. 3,002,427 issued Oct. 3, 1961, to Paul Schäfter and Kurt Kirchhoff, have heretofore been built with four cylindrically refractive air-spaced members of which the first two (as seen from the direction of the longer light rays, or object side) constituted a dispersive front component while the last two represented a collective rear component, the two components together forming an afocal system. Such an attachment has, within its optically effective plane (usually the horizontal), a magnificaton ratio greater than unity as between the object side and the image side of the system, i.e. the picture is contracted in a dimension parallel to that plane upon taking and is enlarged in that dimension upon projecting.

This widening of the field in the horizontal plane on the side of the longer light rays is inconvenient in certain instances in which objectives with a large focal length are used for projection on a relatively remote screen, e.g. for the reproduction of motion pictures in a drive-in theater. An object of our present invention is to provide an anamorphotic attachment adapted to give a wide-screen effect under circumstances in which an increase of the field angle on the object side of the spherical objective would be impractical.

In accordance with this invention we realize the foregoing object by the provision of a four-member anamorphotic attachment in which the conventional position of the optically effective plane in line with the larger dimension of the object-side image is replaced by a disposal of that plane transverse to said larger dimension while the dispersive and collective components of the attachment are interchanged in their position relative to the spherical objective. Thus, an attachment embodying our invention has its effective cross-section in the vertical rather than the horizontal plane for the usual mode of wide-screen cinematography and projection, the object-side image being compressed in that plane rather than expanded to yield the desired wide-screen effect with a field a field of view relatively enlarged in a horizontal axial plane of the objective.

Other, more particular objects of this invention are the provision of an attachment of the character described which can be used in conjunction with objectives of large relative aperture, e.g. of ratio 1:1.6, and the suppression of aberrations in such attachment. These objects can be attained, pursuant to further features of the invention, by constituting each component of the attachment from a singlet and a doublet, with the two doublets preferably facing each other across a large inter-component air space, and by so constructing each of these singlets that its refractive power exceeds 70% of the overall power of the respective component.

Figure 2:
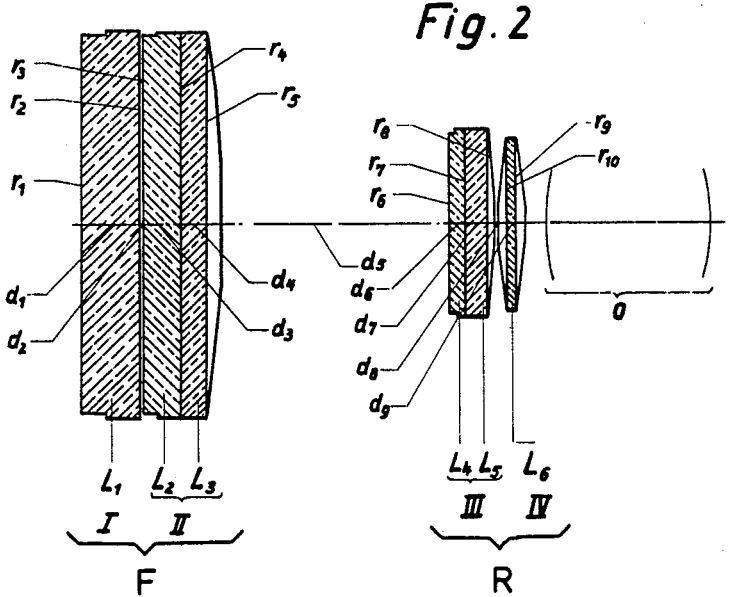

The invention will be described in greater detail with reference to the accompanying drawing in which:

FIG. 1 shows an axial section of an attachment according to the invention in the optically effective plane of its cylindrical members; and FIG. 2 is a similar axial section taken at right angles to that of FIG. 1, i.e. in the optically ineffective plane.

The system shown in the drawing comprises, in juxtaposition with a conventional spherical objective O (indicated schematically), an anamorphotic attachment consisting of a collective front component F and a dispersive rear component R. Component F is constituted by a pair of positively refracting cylindrical members I and II; member I is a single lens $L_1$ with radii $r_1$, $r_2$ and thickness $d_1$, whereas member II is a doublet which is separated from singlet $L_1$ by a small air space $d_2$ and consists of a positive lens $L_2$ (radii $r_3$, $r_4$, thickness $d_3$) cemented onto a negative lens $L_3$ (radii $r_4$, $r_5$, thickness $d_4$). A large air space $d_5$ separates component F from component R which is also constituted by a pair of cylindrical members III and IV. Member III is a second doublet constituted of a negative lens $L_4$ (radii $r_6$, $r_7$, thickness $d_6$) cemented onto a negative lens $L_5$ (radii $r_7$, $r_8$, thickness $d_7$); member IV is another single lens $L_6$ of negative refractivity, separated from member III by a small air space $d_8$ and having radii $r_9$, $r_{10}$ as well as a thickness $d_9$. If the system shown in the drawing is to be used for the production of conventional wide-screen pictures having a major dimension in the horizontal plane, then the plane of the sectional view of FIG. 1 will be vertical. Thus, all the cylinder axes of the lenses $L_1$–$L_6$ lie in the horizontal plane, i.e. in the plane of the major dimension of the image on the object side.

Representative numerical values of the parameters $r_1$–$r_{10}$ and $d_1$–$d_9$ of our system will be given in the following table. These values are given in units of length (e.g. millimeters) based upon a numerical value of $+300$ for the overall focal length $f_F$ of the front component F and a numerical value of $-150$ for the overall focal length $f_R$ of the rear component R of the afocal system I-IV. The table also indicates the preferred refractive indices $n_d$ and Abbé numbers $\nu$ of the several lenses $L_1$–$L_6$.

*Table*

| | | | | $n_d$ | $\nu$ |
|---|---|---|---|---|---|
| F | I | $L_1$ | $r_1 = +175.0$ | 1.51680 | 64.2 |
| | | | $r_2 = \infty$ | | |
| | | | $d_1 = 22.0$ | | |
| | | | $d_2 = 0.5$ | Air space | |
| | II | $L_2$ | $r_3 = +300.0$ | 1.51680 | 64.2 |
| | | | $r_4 = \infty$ | | |
| | | | $d_3 = 14.0$ | | |
| | | $L_3$ | $d_4 = 12.0$ | 1.78470 | 26.1 |
| | | | $r_5 = +544.4$ | | |
| | | | $d_5 = 93.55$ | Air space | |
| R | III | $L_4$ | $r_6 = +273.4$ | 1.62004 | 36.3 |
| | | | $r_7 = +250.0$ | | |
| | | | $d_6 = 6.0$ | | |
| | | $L_5$ | $d_7 = 9.0$ | 1.62041 | 60.3 |
| | | | $r_8 = +235.0$ | | |
| | | | $d_8 = 7.0$ | Air space | |
| | IV | $L_6$ | $r_9 = -186.0$ | 1.51680 | 64.2 |
| | | | $d_9 = 4.0$ | | |
| | | | $r_{10} = +142.0$ | | |
| | | | $d_{total} = 168.05$ | | |

The individual focal length $f_I$ of the single front lens $L_1$ and the individual focal length $f_{IV}$ of the single rear lens $L_6$ may be computed from the foregoing table as $+337.4$ and $-154.6$, respectively. A comparison with the foregoing values for $f_F'$ and $f_R'$ shows that the individual refractive power of member I, given as the reciprocal of its focal length, exceeds 70% of the power of component F whereas the refractive power of member IV similarly exceeds 70% of the power of component R. It also follows from this comparison, as well as from the numerical values given in the table, that the refractive powers of doublets II and III are positive and negative, respectively.

We claim:
1. In an optical system including a spherically effective objective, the combination with said objective of an anamorphotic attachment consisting of four air-spaced cylindrical members, said members being grouped into a first pair constituting a collective component of relatively large diameter and a second pair constituting a dispersive component of relatively small diameter, said second pair being disposed between said objective and said first pair while forming an afocal system with the latter, said first pair consisting of a positively refracting singlet and a positively refracting doublet, said second pair consisting of a negatively refracting singlet and a negatively refracting doublet, each of said singlets having a refractive power exceeding 70% of the overall refractive power of the respective component of which it forms a part.

2. The combination according to claim 1 wherein said first and second pairs are separated from each other by a relatively large air space.

3. The combination according to claim 1 wherein said doublets face each other and are bracketed by said singlets.

4. In an optical system including a spherically effective objective, the combination with said objective of an anamorphotic attachment consisting of four air-spaced cylindrical members, said members including a positively refractive first singlet, a positively refractive first doublet, a negatively refractive second doublet and a negatively refractive second singlet following one another in the order named, the numerical values of the radii $r_1$ to $r_{10}$ and the thicknesses and separations $d_1$ to $d_9$ of said first singlet $L_1$, the lens elements $L_2$, $L_3$ constituting said first doublet, the lens elements $L_4$, $L_5$ constituting said second doublet, and said second singlet $L_6$, based upon a numerical value of $+300$ for the overall focal length of said collective component and of $-150$ for the overall focal length of said dispersive component, their refractive indices $n_d$ and their Abbé numbers $\nu$ being substantially as given in the following table:

Table

|     |       |              |              | $n_d$ | $\nu$ |
|-----|-------|--------------|--------------|-------|------|
| I   | $L_1$ | $r_1 = +175.0$ | $d_1 = 22.0$ | 1.51680 | 64.2 |
|     |       | $r_2 = \infty$ | $d_2 = 0.5$  | Air space | |
| II  | $L_2$ | $r_3 = +300.0$ | $d_3 = 14.0$ | 1.51680 | 64.2 |
|     |       | $r_4 = \infty$ |              |       |      |
|     | $L_3$ |              | $d_4 = 12.0$ | 1.78470 | 26.1 |
|     |       | $r_5 = +544.4$ |              |       |      |
|     |       |              | $d_5 = 93.55$ | Air space | |
|     | $L_4$ | $r_6 = +273.4$ | $d_6 = 6.0$  | 1.62004 | 36.3 |
| III |       | $r_7 = +250.0$ |              |       |      |
|     | $L_5$ |              | $d_7 = 9.0$  | 1.62041 | 60.3 |
|     |       | $r_8 = +235.0$ |              |       |      |
|     |       |              | $d_8 = 7.0$  | Air space | |
| IV  | $L_6$ | $r_9 = -186.0$ | $d_9 = 4.0$  | 1.51680 | 64.2 |
|     |       | $r_{10} = +142.0$ |           |       |      |
|     |       |              | $d_{total} = 168.05$ | | |

References Cited by the Examiner
UNITED STATES PATENTS
2,803,167  8/1957  Kohler et al. _____ 88—57
3,041,935  7/1962  Jacobsen _____ 88—57

FOREIGN PATENTS
753,181  7/1956  Great Britain.

JEWELL H. PEDERSEN, *Primary Examiner.*